United States Patent [19]
Hilgeman

[11] Patent Number: 5,452,121
[45] Date of Patent: Sep. 19, 1995

[54] VARIABLE SPECTRAL RESOLUTION AGILE FILTER

[75] Inventor: Theodore W. Hilgeman, Centerport, N.Y.

[73] Assignee: Northrop Grumman Corporation, Los Angeles, Calif.

[21] Appl. No.: 151,019

[22] Filed: Nov. 12, 1993

[51] Int. Cl.$^6$ .......................... G02F 1/29; G02F 1/03; G01B 9/02
[52] U.S. Cl. ..................... 359/260; 359/261; 359/263; 359/317; 359/320; 356/346; 356/352
[58] Field of Search ............... 359/260, 261, 263, 267, 359/317, 320; 356/352, 346

[56] References Cited

U.S. PATENT DOCUMENTS

| | | | |
|---|---|---|---|
| 4,553,816 | 11/1985 | Durand et al. | 350/164 |
| 4,790,634 | 12/1988 | Miller et al. | 350/347 V |
| 4,923,273 | 5/1990 | Taylor | 350/96.21 |
| 4,994,791 | 2/1991 | Taylor | 356/352 |
| 4,998,017 | 3/1991 | Ryan et al. | 250/343 |
| 4,999,013 | 3/1991 | Zoechbauer et al. | 356/346 |

OTHER PUBLICATIONS

T. Morokuma, "Coherence of Light Filtered by Fabry–Perot Etalons," Jun., 1967, pp. 737–745, Japanese Journal of Applied Physics.

P. D. Henshaw et al., "Digital Beam Switch for Agile Beam Laser Radar," MIT, Massachusetts, SPIE, vol. 202, 1979.

G. Indebetouw, "Tunable Spatial Filtering with a Fabry–Perot Etalon," Applied Optics, pp. 761–764, vol. 19, No. 4, Mar. 1, 1980.

*Primary Examiner*—Georgia Y. Epps
*Assistant Examiner*—Evelyn A. Lester
*Attorney, Agent, or Firm*—Terry J. Anderson; Karl J. Hoch, Jr.

[57] ABSTRACT

A variable spectral resolution agile filter has instantly adjustable spectral resolution with no required mechanical motion and a quickly adjustable center wavelength. Adjustment of the center wavelength is accomplished by reliable piezoelectric actuators. Adjustment of the spectral resolution is achieved by changing the finesse of the system, the finesse being governed by the reflectivity of the faces. By making one of the faces exhibit electrically variable reflectivity, the finesse of the system is instantly changeable, and thus the spectral resolution is also instantly changeable.

5 Claims, 1 Drawing Sheet

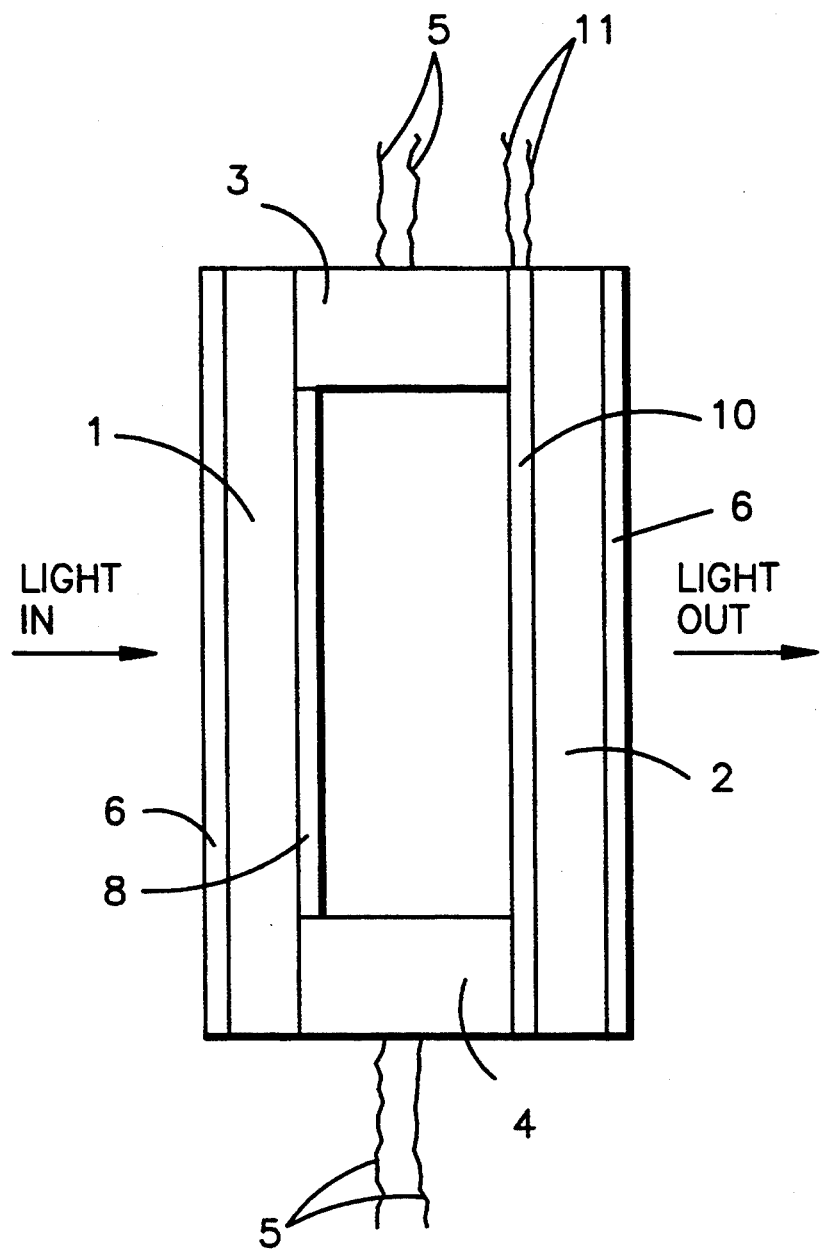

VARIABLE SPECTRAL RESOLUTION AGILE FILTER

BACKGROUND OF THE INVENTION

1. Field of the Invention

This invention relates to the field of spectroscopy, and in particular to a variable spectral resolution agile filter for use in a dispersive spectrometer.

2. Description of Related Art

Spectroscopy is an analytic technique concerned with measurement of the interaction (usually the absorption or emission) of radiant energy with matter. A dispersive spectrometer is a device which measures wavelengths of radiant energy for spectroscopic purposes, and which in general requires a source of radiation, a dispersion device, and a detector.

For many analytic purposes, it is desirable to vary the spectral resolution of the spectrometer, starting the search with a broad spectral resolution and narrowing the spectral resolution when the region of interest is located. For time varying samples, the spectral resolution must be narrowed very quickly, however. Conventional dispersive spectrometers are not suitable for this purpose because, while they can be equipped with variable spectral resolution, the spectral resolution change is slow and is accompanied by a spatial resolution change.

Other known spectrometers are also unsuitable for such spectral analysis of time varying samples. Fourier transform spectrometers, for example, can have variable spectral resolution while preserving spatial imaging, but they require a finite length of time during which the signal is non-varied, or spectral distortions will occur. Spectrometers using Fabry-Perot filters, on the other hand, can have variable center wavelengths and spatial imaging, but are limited to a fixed spectral resolution. Thus, none of the known types of spectrometer achieves both a variable center wavelength and a quickly variable spectral resolution while preserving spatial imaging. In addition, each of the known types of spectrometers, except the Fabry-Perot spectrometer, has moving parts, which can be disadvantageous for many applications, such as for use in long duration missions in outer space.

The present invention solves these problems by providing a quickly adjustable center wavelength without requiring moving parts, using optics similar to those used in the Fabry-Perot spectrometer, while nevertheless also achieving an instantly adjustable spectral resolution. This is accomplished by providing an electrically variable reflective coating on at least one interior surface of an otherwise conventional Fabry-Perot filter.

The use of electrically variable reflectivity is of course known. An example is shown in U.S. Pat. No. 4,923,273 to Taylor, which discloses variable reflectance optic tabs placed in an optical fiber. The optical tabs operate as mirrors in a Fabry-Perot interferometer. However, this device is inherently a one-dimensional device incapable of producing an image, and is intended for use with only a single wavelength. It therefore does not correspond to a variable resolution wavelength filter or spectrometer of the type described and claimed below.

SUMMARY OF THE INVENTION

It is a first objective of the present invention to provide a variable spectral resolution agile filter having instantly adjustable spectral resolution.

It is a second objective of the invention to provide a variable spectral resolution agile filter having both an instantly adjustable spectral resolution and a quickly adjustable center wavelength.

It is a third objective of the invention to provide a variable spectral resolution agile filter having both an instantly adjustable spectral resolution with no required mechanical motion and a quickly adjustable center wavelength using a reliable piezoelectric actuator.

Achievement of these objectives avoids the difficulties mentioned above for conventional spectrometers and further has the advantage of providing a variable spectral resolution agile filter which can be used in front of a two-dimensional imaging focal plane, the conventional dispersive spectrometer being limited to a one-dimensional line image.

The objectives of the invention are achieved by utilizing optics similar to those of a Fabry-Perot spectrometer in which the center wavelength is tuned by changing the free-spectral range using piezoelectric actuators, by placing a mosaic imaging focal plane behind the filter to obtain spatial resolution, and in particular by providing means for changing the finesse of the system in order to obtain the variable spectral resolution.

The finesse of a Fabry-Perot is governed by the reflectivity of its faces, and thus in accordance with an especially preferred embodiment of the invention, the objectives of the invention are achieved by causing one or both interior faces to exhibit electrically variable reflectivity.

The invention thus provides a combination of an electrically variable reflectant surface with Fabry-Perot spectrometer type optics to produce independently variable spectral resolution and center wavelengths while preserving a spatial imaging capability in two-dimensions. Uses of the preferred variable spectral resolution agile filter include imaging spectrometry, when combined with a mosaic focal plane, remote detection and identification of unknown chemical species, process control, i.e., the detection and identification of unknown contaminants, and remote identification of unknown laser lines.

BRIEF DESCRIPTION OF THE DRAWING

The drawing FIGURE shows a variable spectral resolution agile filter constructed in accordance with the principles of a preferred embodiment of the invention.

DETAILED DESCRIPTION OF THE PREFERRED EMBODIMENT

As shown in the FIGURE, the preferred variable spectral resolution agile filter is based on optics similar to a Fabry-Perot spectrometer, but with the addition of instantly adjustable spectral resolution. The preferred filter includes a polished transmissive front window 1, a polished transmissive rear window 2, and a pair of piezoelectric actuators 3 and 4 connected in known fashion via electrical connections 5 to a control system for causing the piezoelectric actuators to tune the center wavelength by changing the free spectral range of the filter, i.e., the distance between windows 1 and 2.

Each of windows 1 and 2 includes an antireflection coating 6 on exterior surfaces thereof. On one interior surface of one of the windows, a partially reflecting coating 8 is included. Both the anti-reflective coatings and the partially reflected coating are of known type and are conventionally used in Fabry-Perot filters.

Uniquely, however, in order to change the finesse and thus the spectral resolution of the filter the filter preferably also includes, on one surface of one of the windows, a material 10 having an electrically variable reflectance, and an electrical connection 11 for controlling the electrically variable reflectance of the material. One suitable coating is vanadium oxide, which has previously been used in optical taps of the type described in U.S. Pat. No. 4,923,273 to Taylor. Other suitable electrically variable reflective coatings may also be used.

Finally, as those skilled in the art will appreciate, both interior window surfaces, rather than a single surface, may be provided with the electrically variable reflective coating and appropriate electrical connections. will be appreciated that those practicing the invention based on the above disclosure may depart from the description in various ways while still practicing the invention. Consequently, it is intended not be limited by the above description and drawing figure, but rather that it be defined solely by the appended claims.

I claim:

1. In a variable spectral resolution agile filter, comprising:
    a pair of windows at least partially transparent to electromagnetic radiation; and
    tuning means for adjusting an optical path length between said windows to thereby change a center wavelength of the filter, the improvement wherein: said filter includes finesse varying means for varying a finesse of the filter in order to vary its spectral resolution.

2. A filter as claimed in claim 1, wherein said finesse varying means comprises
    a partially reflecting coating on one of said windows;
    an electrically variable reflectance material on a surface of the other of said windows which faces said partially reflecting coating; and
    means for electrically controlling the reflectance of said electrically variable reflectance material in order to vary the spectral resolution of said filter.

3. A filter as claimed in claim 2, wherein said tuning means comprises a piezoelectric actuator, and means for controlling an electric voltage applied to said actuator.

4. A filter as claimed in claim 2, wherein said electrically variable reflectance material is vanadium oxide.

5. A filter as claimed in claim 2, further comprising anti-reflection coatings on surfaces of said windows opposite to said first and second surfaces.

* * * * *